(12) United States Patent
Watanabe et al.

(10) Patent No.: US 7,244,057 B2
(45) Date of Patent: Jul. 17, 2007

(54) HEADLIGHT

(75) Inventors: Shigeyuki Watanabe, Shizuoka (JP);
Naoki Tatara, Shizuoka (JP); Kazuki Okui, Shizuoka (JP); Hirohiko Ohshio, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 128 days.

(21) Appl. No.: 11/003,190

(22) Filed: Dec. 3, 2004

(65) Prior Publication Data

US 2005/0122737 A1  Jun. 9, 2005

(30) Foreign Application Priority Data

Dec. 5, 2003  (JP) .............................. 2003-407284

(51) Int. Cl.
*F21V 29/00* (2006.01)

(52) U.S. Cl. ...................... 362/544; 362/507; 362/523; 362/538; 362/543; 362/545; 362/549

(58) Field of Classification Search ................ 362/507, 362/523, 538, 543, 544, 545, 549
See application file for complete search history.

(56) References Cited

U.S. PATENT DOCUMENTS 6,511,215 B2 * 1/2003 Hashigaya .................. 362/515

2004/0202007 A1 * 10/2004 Yagi et al. .................. 362/545

FOREIGN PATENT DOCUMENTS

JP     2003-123517     4/2003

* cited by examiner

*Primary Examiner*—Stephen F Husar
*Assistant Examiner*—Meghan K. Dunwiddie
(74) *Attorney, Agent, or Firm*—Osha Liang LLP

(57) ABSTRACT

Optical axes are simultaneously adjusted by tiltably mounting a plurality of lighting device units on a common unit support member. A rectilinear propagation blocking member of each lighting device unit is fixed with screw via the elastic bush to the unit support member, so that the optical axis can be adjusted. Due to the above structure, even when the accuracy of shapes of the rectilinear propagation blocking member and the unit support member are not sufficiently ensured and also even when the accuracy of the attaching work can not be sufficiently ensured, the optical axes of the lighting device units can be arranged in order by adjusting the optical axis of the rectilinear propagation blocking member.

5 Claims, 14 Drawing Sheets

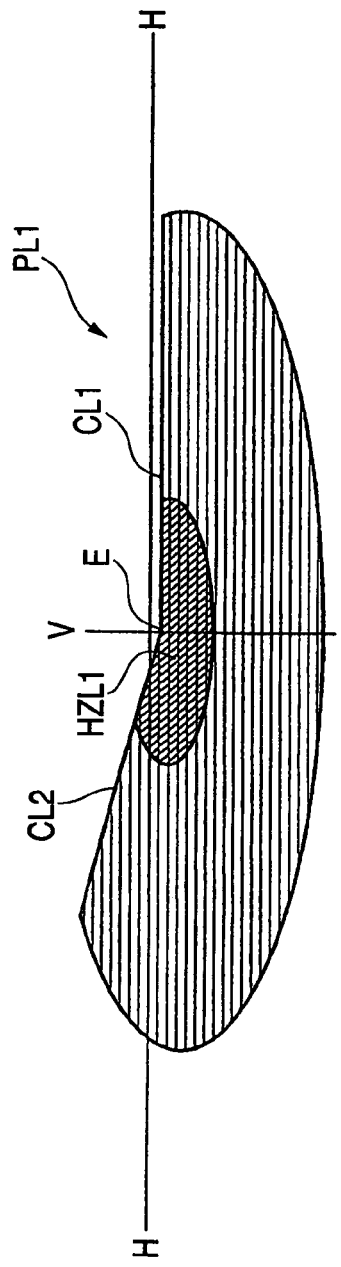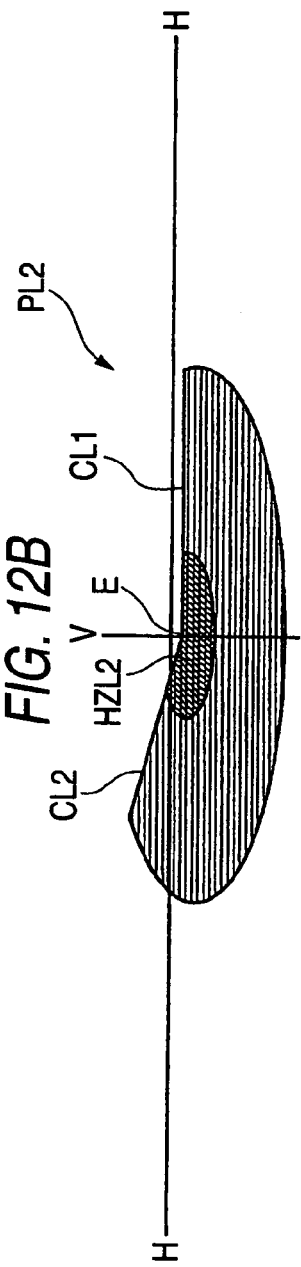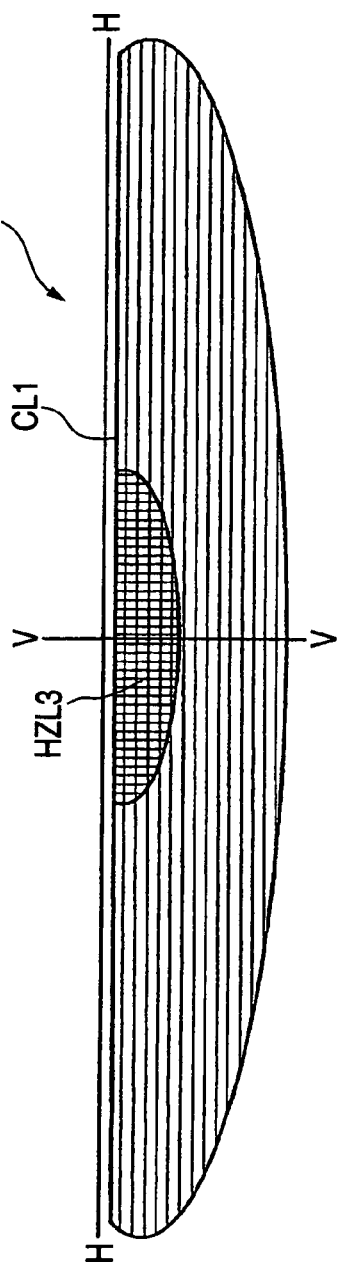

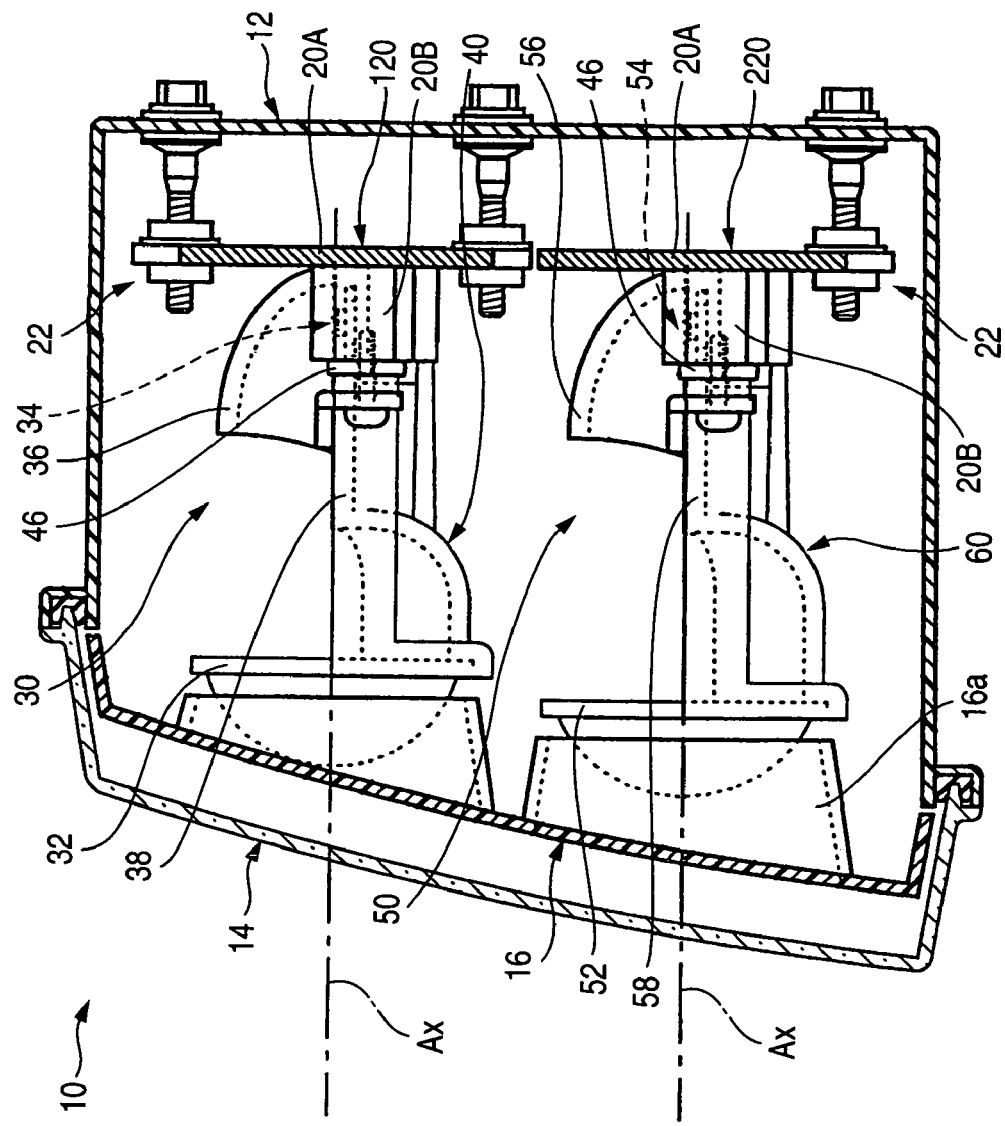

HEADLIGHT

This application claims foreign priority based on Japanese patent application No. JP-2003-407284, filed on Dec. 5, 2003, the contents of which is incorporated herein by reference.

BACKGROUND OF THE INVENTION

The present invention relates to a headlight for vehicle use to form a predetermined light distribution pattern when light is irradiated by a plurality of lighting device units.

In general, a headlight for vehicle use is composed in such a manner that a light distribution pattern for a low beam, in the upper end edge of which a cutoff line is made, can be formed. Due to the above constitution, while a driver in a vehicle running in the opposite direction is not being given glare, the visibility in the front of a driver who drives a vehicle can be ensured as positively as possible.

JP-A-2003-123517 discloses a headlight for vehicle use composed in such a manner that a light distribution pattern for a low beam is formed by the irradiation of light sent from a plurality of lighting device units, the light sources of which are light emitting elements.

By the lighting device of JP-A-2003-123517, it becomes possible to reduce the thickness of the lighting device. However, on the lighting device of JP-A-2003-123517, it is necessary to adjust an optical axis of each of the plurality of lighting device units.

On the other hand, when such a constitution that a plurality of lighting device units are supported by a common unit support member is employed, it is possible to simultaneously adjust optical axes of a plurality of lighting device units by tilting the unit support member.

However, in order to realize to simultaneously adjust the optical axes of the plurality of lighting device units by tilting the unit support member, it is necessary to attach the plurality of lighting device units to the unit support member while the optical axes of the lighting device units are put in order. In order to put the optical axes of the lighting device units in order, the lighting device units must be highly accurately attached to the unit support member.

SUMMARY OF THE INVENTION

The present invention has been accomplished in view of the above circumstances. It is an object of the present invention to provide a headlight for vehicle use to form a predetermined light distribution pattern when light is irradiated by a plurality of lighting device units, the headlight characterized in that: the thickness of the lighting device is reduced; and the optical axes of the plurality of lighting device units can be simultaneously adjusted under the condition that the optical axes of the lighting device units are put in order.

In the invention of the present patent application, since a supporting structure for supporting the lighting device units relative to the unit support member is devised, the above object can be accomplished.

The present invention provides a headlight for vehicle use to form a predetermined light distribution pattern when light is irradiated by a plurality of lighting device units, characterized in that:

the plurality of lighting device units are supported by a common unit support member; each lighting device unit has a light emitting element and at least one optical member for controlling the light emitted by the light emitting element, the optical member and the light emitting element being individually attached to the unit support member; and the predetermined optical member in each lighting device unit is attached to the unit support member in an embodiment in which the optical axis of the predetermined optical member in each lighting device unit can be adjusted.

The above "a predetermined light distribution pattern" may be a light distribution pattern, in the upper end edge of which a cutoff line is provided. Alternatively, the above "a predetermined light distribution pattern" may be a light distribution pattern, in the upper end edge of which a cutoff line is not provided. In this case, the light distribution pattern, in the upper end edge of which a cutoff line is provided, may be a light distribution pattern for a low beam. Alternatively, the light distribution pattern, in the upper end edge of which a cutoff line is provided, may be a light distribution pattern composing a portion of this light distribution pattern for a low beam. In this connection, in the case of a light distribution pattern composing a portion of the light distribution pattern for a low beam, the light distribution pattern for a low beam can be formed as a compound light distribution pattern in which this light distribution pattern is compounded with a light distribution pattern which is formed by the irradiation of light sent from the lighting device unit except for the above plurality of lighting device units.

The above "light emitting element" means an element-shaped light source having a substantially dot-shaped light emitting portion from which light is emitted. The type of the above "light emitting element" is not particularly limited. For example, a light emitting diode or a laser diode can be adopted.

Concerning the above "at least one optical member", as long as it can control the light which has been emitted from the light emitting element, the specific constitution of each optical member is not particularly limited.

In the case where the above "at least one optical member" is a plurality of optical members, these optical members may be individually attached to the unit support member. Alternatively, these optical members may be simultaneously attached to the unit support member.

The aforementioned "embodiment in which an optical axis can be adjusted" is not particularly limited. For example, it is possible to adopt an embodiment in which the optical member is tiltably attached to the unit support member. Alternatively, it is possible to adopt an embodiment in which the optical member is slidably attached to the unit support member.

As shown in the above constitution, the headlight of the present invention is composed in such a manner that a predetermined light distribution pattern is formed by the irradiation of light sent from a plurality of lighting device units, the light sources of which are light emitting elements. Therefore, it is possible to reduce the thickness of the lighting device.

Moreover, in the headlight of the present invention, a plurality of lighting device units are supported by a common unit support member. Therefore, when this unit support member is tilted, the optical axes of the plurality of lighting device units can be simultaneously adjusted.

Further, in the headlight the present invention, each lighting device unit has a light emitting element and at least one optical member for controlling the light emitted by the light emitting element, and the optical member and the light emitting element are individually fixed to the unit support member. Therefore, compared with a case in which the lighting device units in a completed state are attached to the unit support member, the lighting device constitution can be simplified.

Furthermore, in the headlight of the present invention, a predetermined optical member in each lighting device unit is attached to the unit support member so that the optical axis can be adjusted. Therefore, even in the case where the accuracy of shapes of the optical member and the unit support member can not be sufficiently ensured and also even in the case where the accuracy of the attaching work can not be sufficiently ensured, when the optical axis of the optical member is appropriately adjusted, the optical axes of the lighting device units can be easily arranged in order.

According to the present invention, in the headlight in which a predetermined light distribution pattern is formed by the irradiation of light sent from a plurality of lighting device units, the thickness of the lighting device is reduced, and further the optical axes of the plurality of lighting device units can be simultaneously adjusted under the condition that the optical axes are put in order.

When the unit support member is composed of a die-cast product in the above constitution, the following operational effects can be provided.

When the light emitting element of each lighting device unit emits light, heat is generated. However, since each light emitting element is attached to the unit support member composed of a die-cast product, heat generated by each light emitting element can be quickly transmitted to the unit support member, the heat capacity of which is large, by the action of heat conduction. Due to the foregoing, a temperature rise in the light emitting element can be suppressed. Therefore, it is possible to effectively prevent the luminous flux of the light emitting element from being decreased. It is also possible to prevent the color of emitted light from becoming discolored.

In the above constitution, when it is composed in such a manner that the predetermined optical member is fixed being to the unit support member with screws through elastic bushes at a plurality of positions, it is possible to tilt the optical member by a very simple structure and adjust the optical axis.

Instead of the constitution described above in which a plurality of lighting device units are supported by a common unit support member, it is possible to compose in such a manner that a plurality of unit support members are provided, a plurality of lighting device units are classified into a plurality of groups and each group is supported by each unit support member.

According to the above constitution, when each unit support member is tilted, optical axes of a plurality of lighting device units can be adjusted for each group all at once. Due to the foregoing, although the operation of adjusting the optical axis becomes somewhat complicated, the optical axis can be precisely adjusted.

BRIEF DESCRIPTION OF THE DRAWINGS

FIG. 9 is a view showing a lighting device unit for condensing light of the above headlight in detail, wherein FIG. 9 is drawn in the same manner as that of FIG. 6.

FIG. 10 is a view showing a lighting device unit for wide diffusion of the above headlight in detail, wherein FIG. 10 is drawn in the same manner as that of FIG. 6.

FIGS. 12A to 12C are views showing a light distribution pattern composing a portion of the above light distribution pattern for a low beam, wherein FIG. 12A is a view showing a light distribution pattern formed by the irradiation of light sent from the above lighting device unit for medium diffusion, FIG. 12B is a view showing a light distribution pattern formed by the irradiation of light sent from the above lighting device unit for condensing light and FIG. 12C is a view showing a light distribution pattern formed by the irradiation of light sent from the above lighting device unit for wide diffusion.

FIG. 13 is a view showing a variation of the above embodiment, wherein FIG. 13 is drawn substantially in the same manner as that of FIG. 1.

FIG. 14 is a sectional view taken on line XIV-XIV in FIG. 13.

DESCRIPTION OF THE PREFERRED EMBODIMENT

Figure 1:
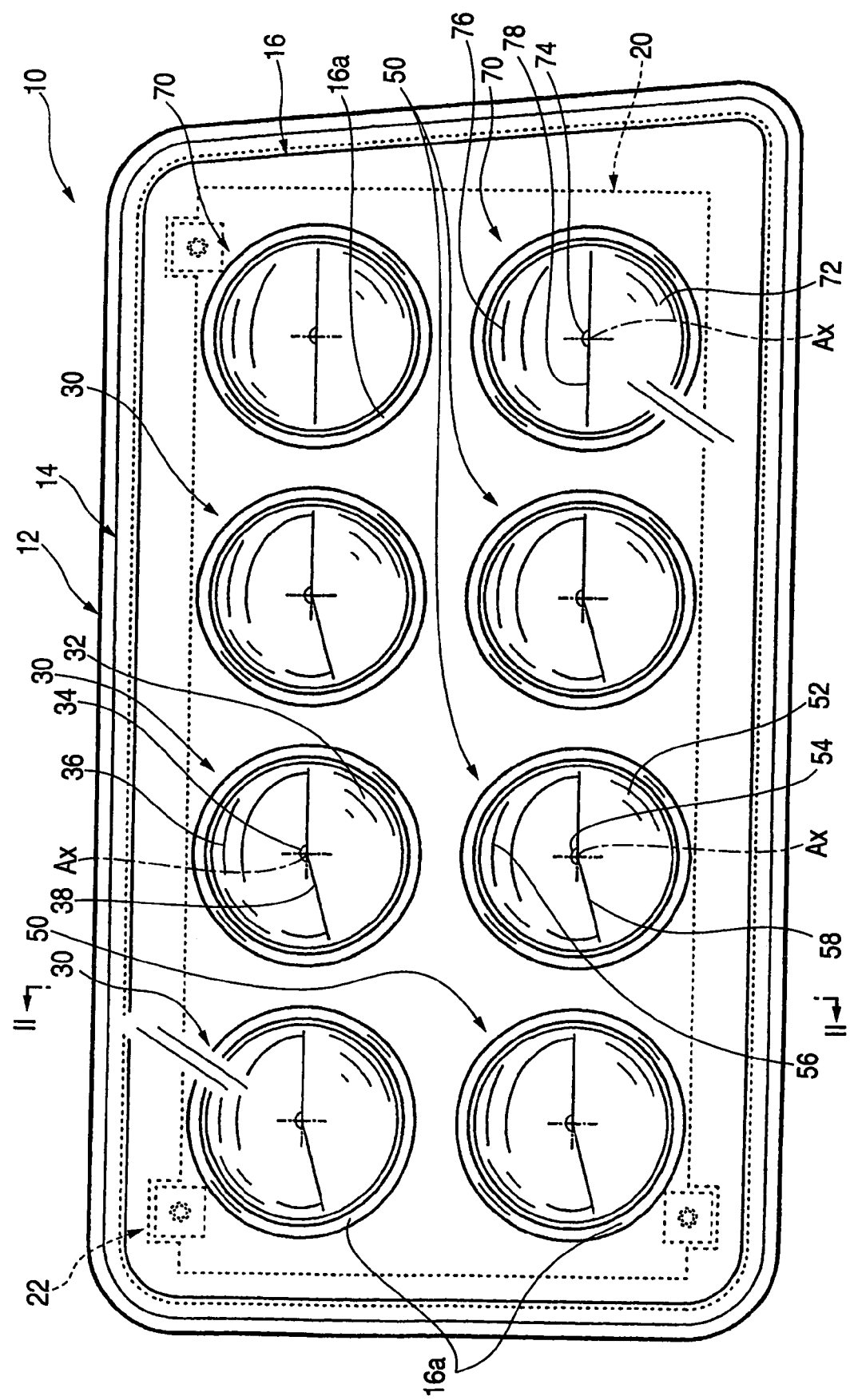
FIG. 1 is a front view showing a headlight of an embodiment of the present invention.

Referring to the drawings, an embodiment of the present invention will be explained below.

Figure 2:
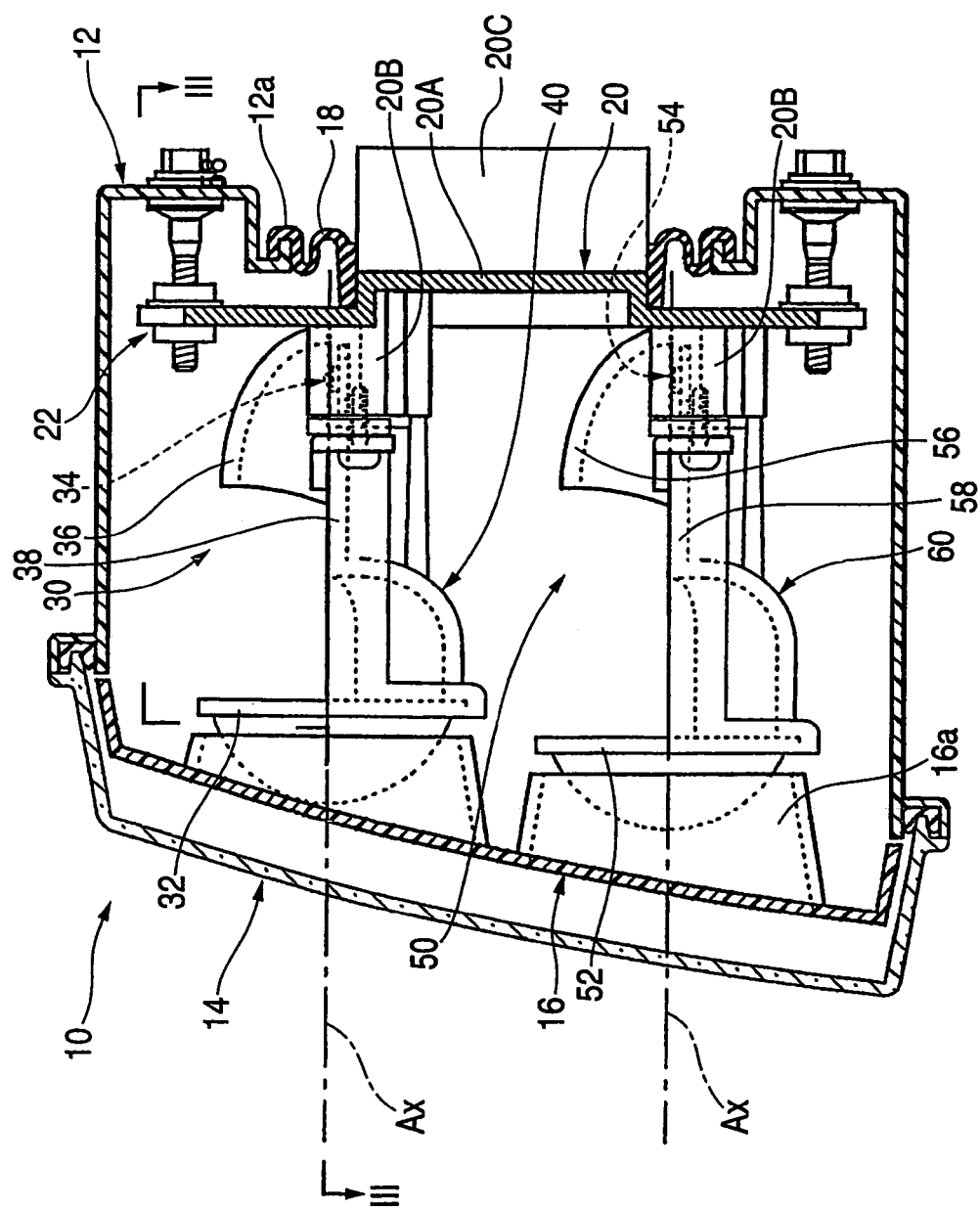
FIG. 2 is a sectional view taken on line II-II in FIG. 1.
Figure 3:
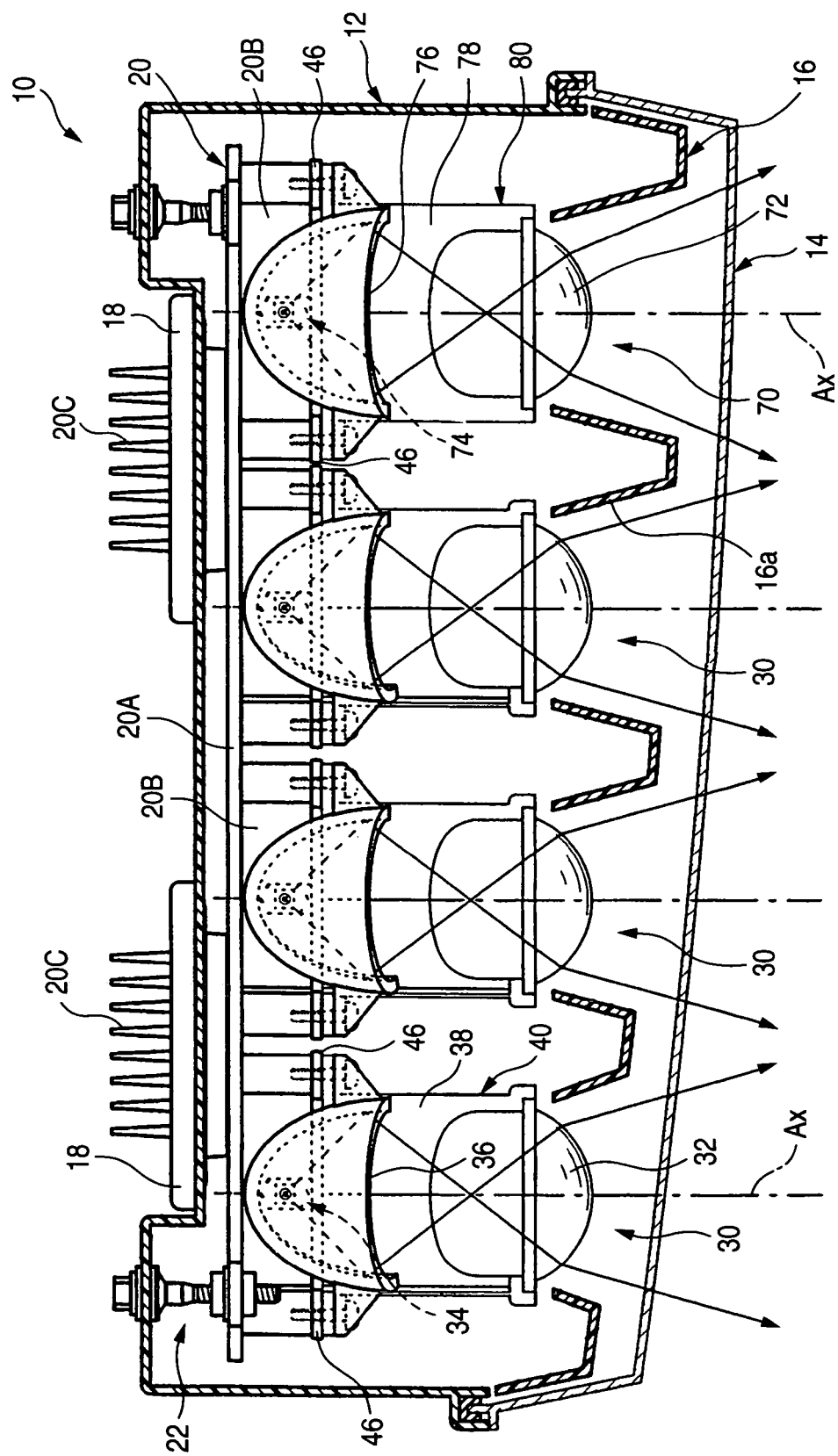
FIG. 3 is a sectional view taken on line III-III in FIG. 2.

FIG. 1 is a front view showing a headlight for vehicle use of an embodiment of the present invention, FIG. 2 is a sectional view taken on line II-II in FIG. 1, and FIG. 3 is a sectional view taken on line III-III in FIG. 2.

As shown in these drawings, the headlight 10 for vehicle use of this embodiment is a lighting device arranged on the right of a front end portion of a vehicle. The headlight 10 for vehicle use is composed in such a manner that eight lighting device units 30, 50, 70, four of them are arranged in the upper step and the other four of them are arranged in the lower step, are accommodated in a lighting chamber including a lamp body 12 and a transparent light transmission cover 14 attached to the front end opening of the lamp body 12. In this headlight 10 for vehicle use, a light distribution pattern for a low beam can be formed by the irradiation of light sent from these eight lighting device units 30, 50, 70.

In the above light chamber, an inner panel 16 is arranged along the light transmission cover 14. At positions on the inner panel corresponding to the lighting device units 30, 50, 70, the cylindrical opening portions 16a surrounding the lighting device units 30, 50, 70 are formed.

All of the eight lighting device units 30, 50, 70 are composed as a projector type lighting device unit. While these eight lighting device units 30, 50, 70 are being attached to the common support member 20, they are tiltably supported by the lamp body 12 via the aiming mechanism 22 so that these eight lighting device units 30, 50, 70 can be tilted in the vertical and the traverse direction.

The unit support member 20 is composed of a die-cast product, for example, an aluminum die-cast product. The unit support member 20 includes: a perpendicular panel portion 20A; a unit attaching portion 20B extending like a shelf to the front from the perpendicular panel portion 20A at a plurality of portions; and a heat sink portion 20C composed of a plurality of radiating fins extending from the perpendicular panel portion 20A to the rear.

The heat sink portion 20C is arranged at two portions, one is a right portion and the other is a left portion. The right and the left heat sink portion are protruded from the two circular opening portions 12a, which are formed on a rear wall of the lamp body 12, to the outer space of the lighting device. A rubber cover 18 for sealing is attached to each opening portion 12a. An inner circumferential portion of the rubber cover 18 is engaged with an outer circumferential base end portion of the heat sink portion 20C, and an outer circumferential portion of the rubber cover 18 is engaged with the opening portion 12a of the lamp body 12.

The optical axes $A_x$ of the lighting device units 30, 50, 70 are extended in parallel with each other in the direction substantially perpendicular to the perpendicular panel portion 20A. After the optical axis adjustment made by the aiming mechanism 22 has been completed, the optical axes $A_x$ of the lighting device units 30, 50, 70 are extended in a downward direction by an angle 0.5 to 0.6° with respect to the longitudinal direction of a vehicle.

The three lighting device units 30, which are among the eight lighting device units 30, 50, 70 and located on the outside in the vehicle width direction in the upper step, are composed as lighting device units for medium diffusion. The three lighting device units 50, which are among the eight lighting device units 30, 50, 70 and located on the outside in the vehicle width direction in the lower step, are composed as lighting device units for condensing light. The two lighting device units 70, which are located at the end portions on the inside in the vehicle width direction in the upper and the lower step, are composed as lighting device units for wide diffusion.

Next, the specific structure of the lighting device units 30, 50, 70 will be explained below.

First, the specific structure of the lighting device units 30 for medium diffusion will be explained as follows.

Figure 4:
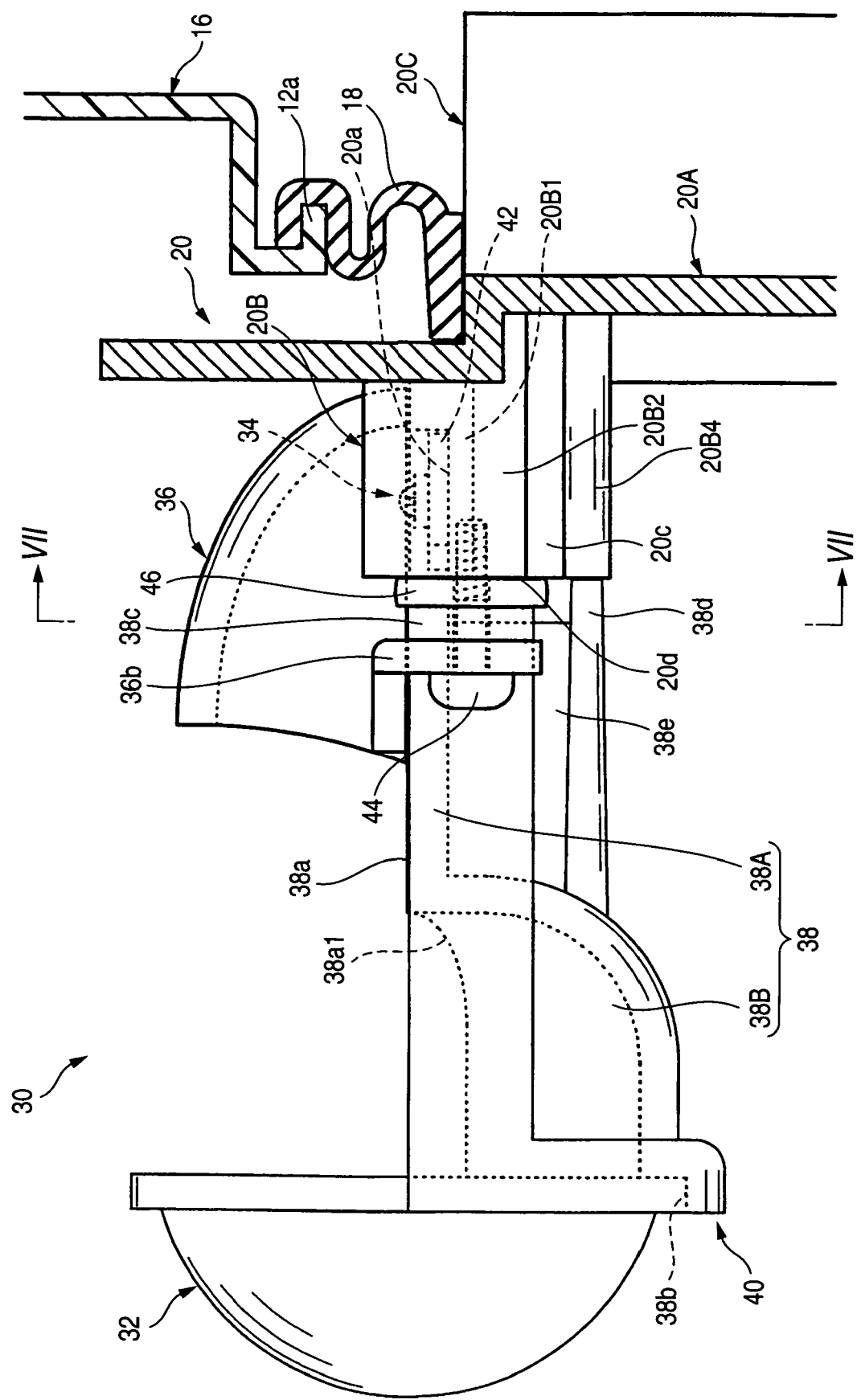
FIG. 4 is an enlarged view showing a primary portion of FIG. 2 in which a lighting device unit for medium diffusion of the above headlight is shown in detail.
Figure 5:
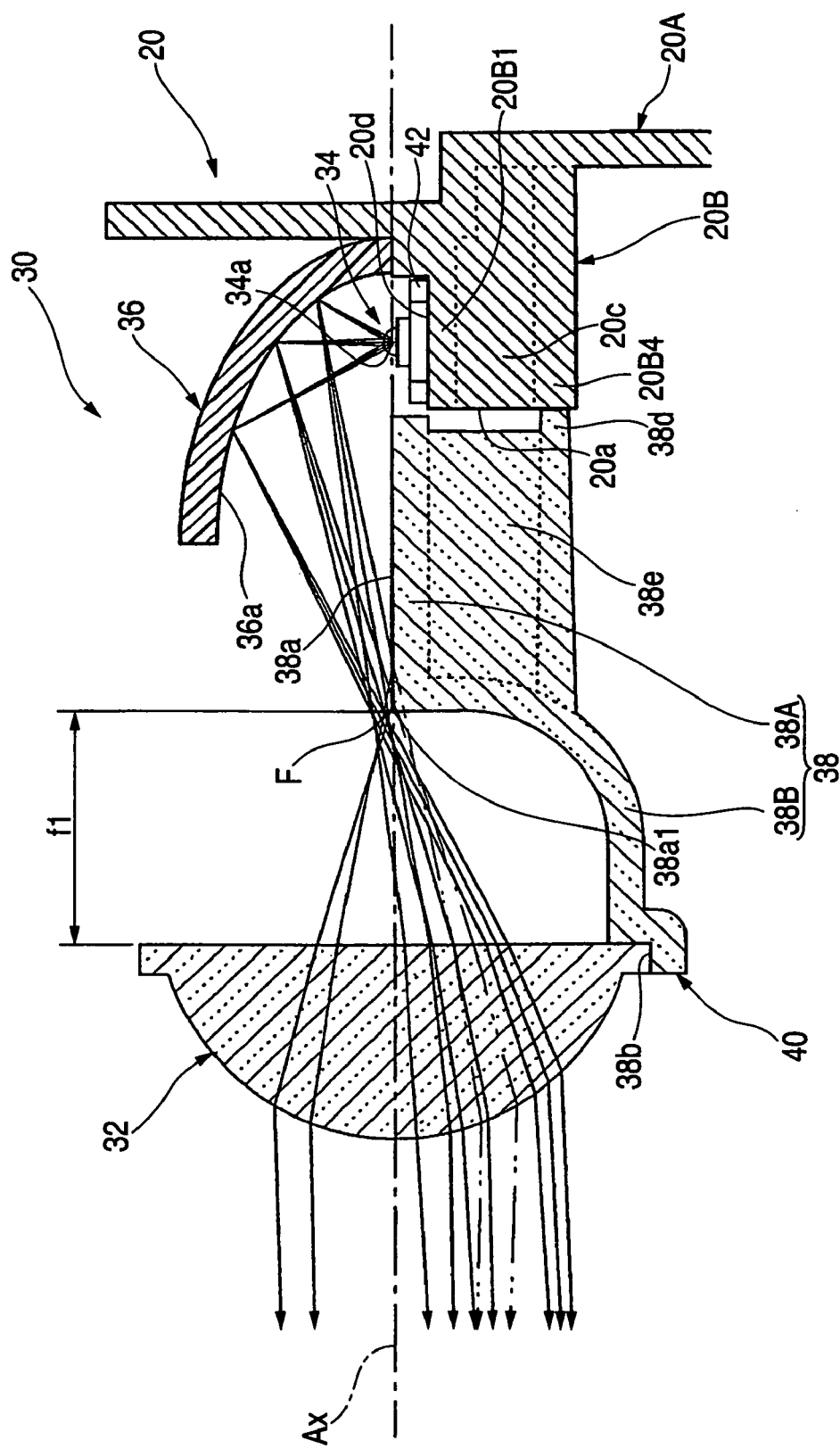
FIG. 5 is a sectional side view showing the above lighting device unit for medium diffusion in detail.
Figure 6:
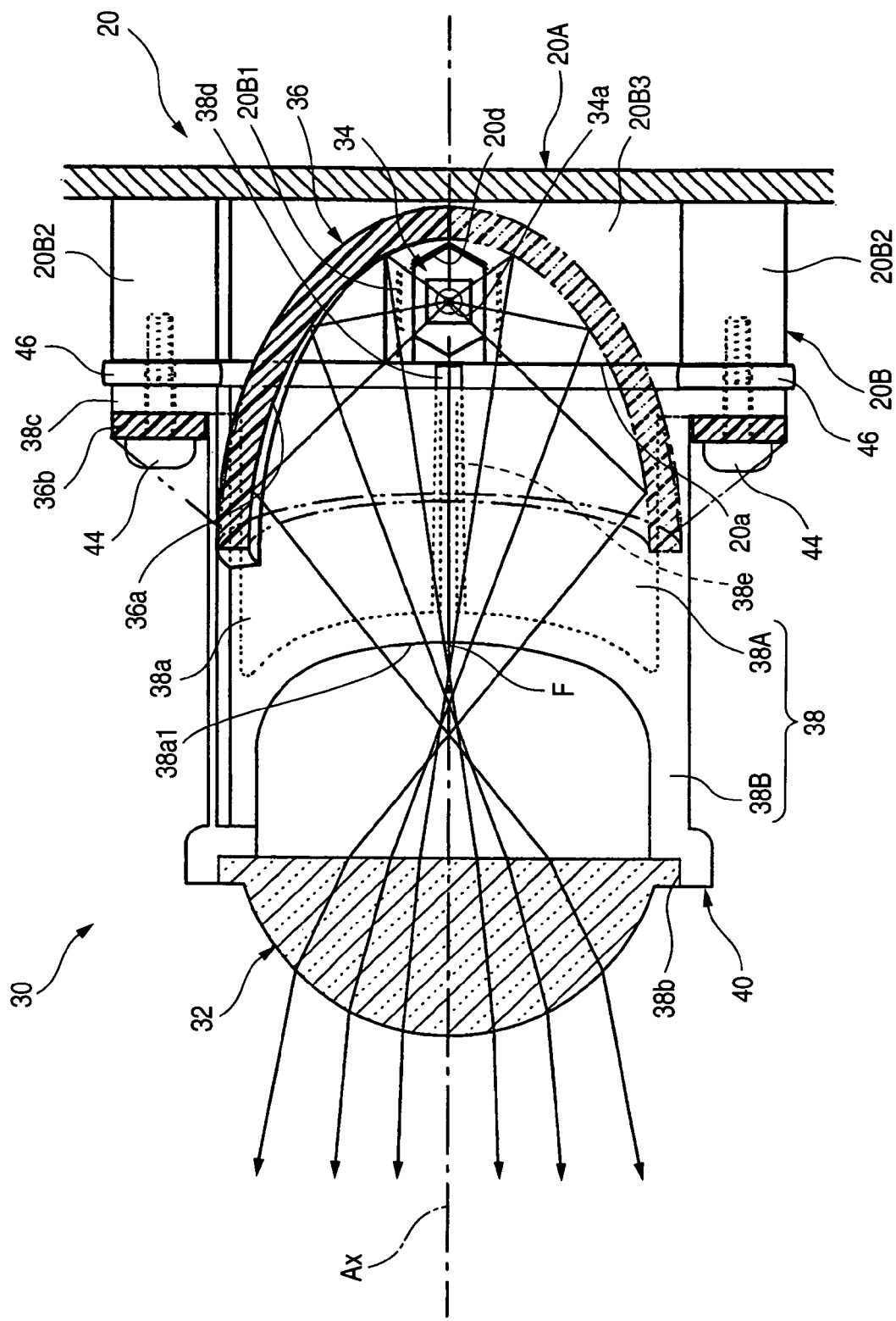
FIG. 6 is a sectional plan view showing the above lighting device unit for medium diffusion in detail.
Figure 7:
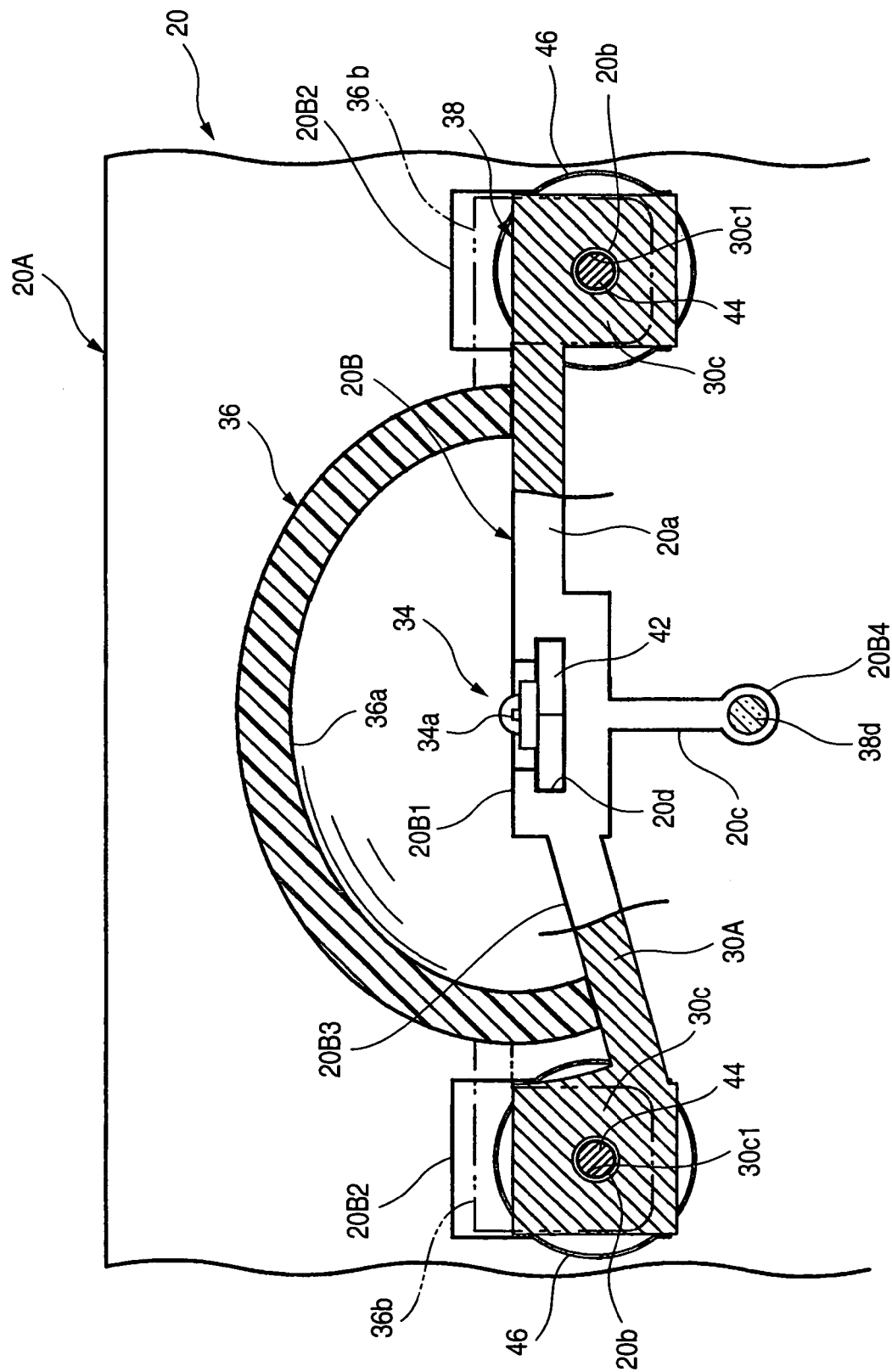
FIG. 7 is a sectional view taken on line VII-VII in FIG. 4.
Figure 8:
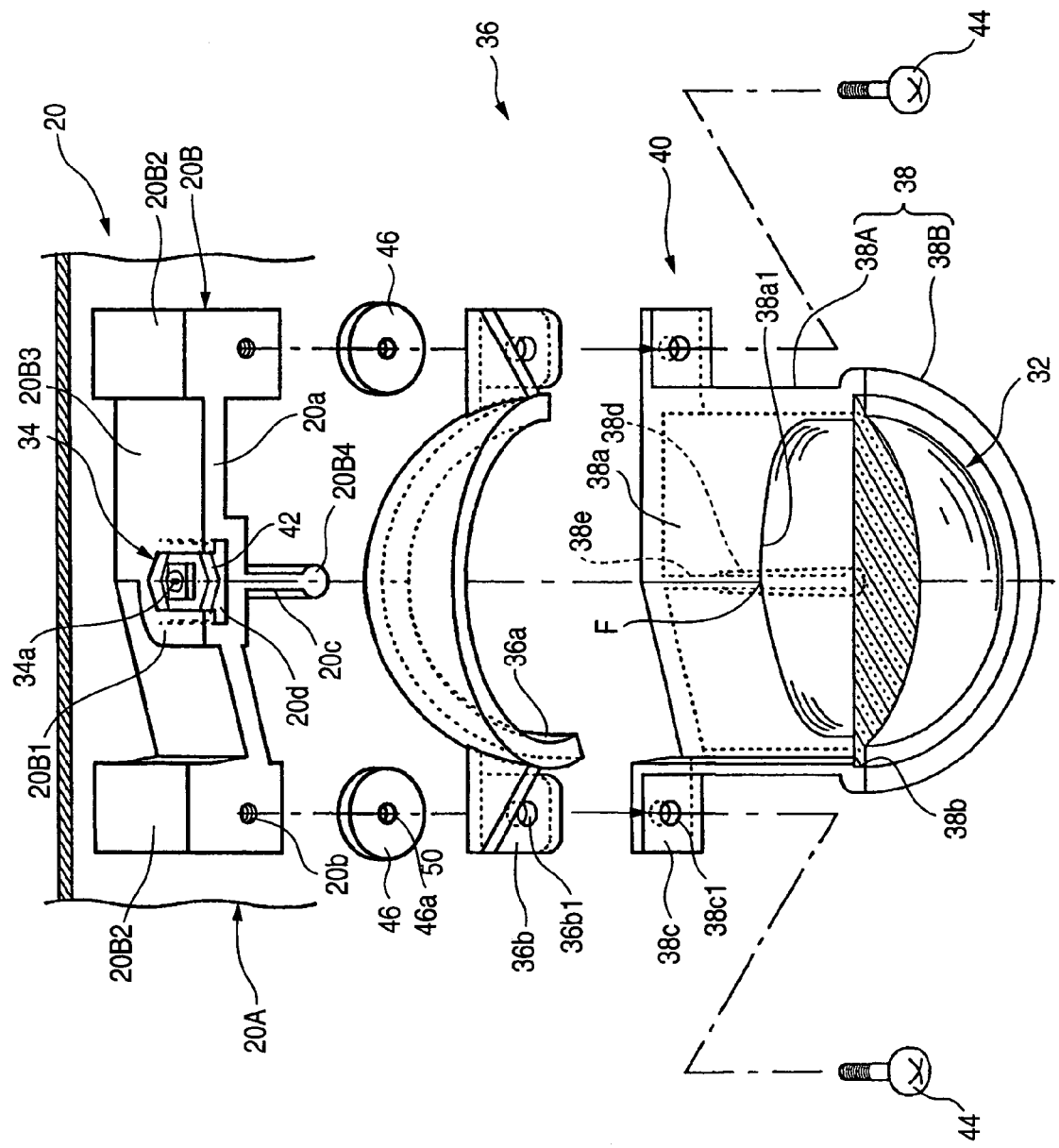
FIG. 8 is an exploded perspective view for explaining an attaching structure of attaching the above lighting device unit for medium diffusion to a unit support member.

FIG. 4 is an enlarged view showing a primary portion of FIG. 2 in which the lighting device unit 30 for medium diffusion is shown in detail. FIGS. 5 and 6 are the sectional side view and the sectional plan view. FIG. 7 is a sectional view taken on line VII-VII in FIG. 4. FIG. 8 is an exploded perspective view for explaining an attaching structure in which the lighting device unit 30 for medium diffusion is attached to the unit support member 20.

As shown in these drawings, the lighting device unit 30 for medium diffusion includes: a projection lens 32 arranged on the optical axis $A_x$; a light emitting element 34 arranged at the rear of this projection lens 32; a reflector 36 arranged so that the reflector 36 can cover this light emitting element 34 from the upper side; and a rectilinear propagation blocking member 38 arranged between the light emitting element 34 and the projection lens 32.

In this lighting device unit 30 for medium diffusion, the projection lens 32 and the rectilinear propagation blocking member 38 are integrally formed as a light control member 40 by means of insertion molding. In this lighting device unit 30 for medium diffusion, the light emitting element 34, the reflector 36 and the light control member 40 are individually attached to the unit attaching portion 20B of the unit support member 20. In this way, the lighting device unit is composed.

The projection lens 32 is a transparent lens made of resin (for example, a transparent lens made of acrylic resin) which is composed as a plano-convex lens, the front surface of which is formed into a convex and the rear surface of which is formed into a plane. The focal distance of the projection lens 32 is f1, which is relatively short.

The light emitting element 34 is a white light emitting diode having a light emitting chip 34a, the size of which is approximately 0.3 to 1 mm square, and supported by the support plate 42 made of metal, the shape of which is a regular hexagon. This light emitting element 34 is attached to the unit attaching portion 20B of the unit support member 20 under the condition that the light emitting chip 34a is arranged being directed perpendicularly upward on the optical axis $A_x$.

The reflector 36 is composed in such a manner that the light emitted from the light emitting element 34 is reflected to the front side being directed to the optical axis $A_x$ side, so that the light can be substantially converged upon the neighborhood of the rear side focus F of the projection lens 32. Specifically, the reflecting face 36a of this reflector 36 is set in such a manner that the cross section of the reflector 36 including the optical axis $A_x$ is formed into a substantial elliptical shape and that the eccentricity is gradually increased from the perpendicular cross section to the horizontal cross section. This reflecting face 36a is formed so that the light sent from the light emitting element 34 can be substantially converged at a position somewhat ahead of the rear side focus F.

This reflector 36 includes a pair of brackets 36b, one is arranged on the right and the other is arranged on the left. This reflector 36 is fixed being screwed to the unit support member 20 in both the brackets 36b under the condition that the peripheral lower end portion is made to come into contact with an upper face of the unit attaching portion 20B of the unit support member 20.

The rectilinear propagation blocking member 38 is a transparent member made of resin (for example, a member made of resin of polycarbonate). This rectilinear propagation blocking member 38 includes: a main body 38A, the upper face 38a of which is formed into a substantial C-shape when it is viewed from the front of the lighting device; and a lens holder portion 38B formed being extended from the front end-portion of the main body 38A to the front of a vehicle.

The upper face 38a of the main body 38A extends to the rear from the rear side focus F of the projection lens 32, and the front end edge 38a1 of the main body 38A is formed into a substantial arc shape along the focal face of the rear side focus F of the projection lens 32. This upper face 38a is formed as follows. A region on the left (on the right when it is viewed from the front of the lighting device) with respect to the optical axis $A_x$ is composed of a plane horizontally extending to the left from the optical axis $A_x$, and a region on the right with respect to the optical axis $A_x$ is composed of a plane extending from the optical axis $A_x$ to the right obliquely downward (for example, by the angle 15° downward). This upper face 38a is subjected to reflecting face treatment by means of aluminum vapor deposition. Due to the foregoing, a portion of the reflected light sent from the reflecting face 36a of the reflector 36 is prevented from propagating straight by the upper face 38a. The upper face

38a is composed as a reflecting face on which the portion of the reflected light sent from the reflecting face 36a is reflected upward.

The lens holder 38B extends to the front from the front end portion of the main body 38A so that it can be curved downward. The lens holder 38B supports the projection lens 32 by the semicircular positioning groove 38b formed in the front end portion of the lens holder 38B. As described before, this fixing and supporting action can be conducted when the projection lens 32, the rectilinear propagation blocking member 38 and the light control member 40 are integrally formed by means of insertion molding. At this time, while the projection lens 32 is being inserted, the rectilinear propagation blocking member 38 is made by means of injection molding.

In the rectilinear propagation blocking member 38, a pair of brackets 38c, one is arranged on the right and the other is arranged on the left, are formed at the rear end portion of the main body 38A. In a lower portion of the main body 38A of the rectilinear propagation blocking member 38, the positioning pin 38d protruding from the lens holder 38B to the rear is formed. Between the positioning pin 38d and the main body 38A, the perpendicular rib 38e for connecting both the positioning pin 38d and the main body 38A is formed.

On the other hand, the unit attaching portion 20B of the unit support member 20 includes: a light source fixing portion 20B1 for fixing and supporting the light emitting element 34; a pair of boss portions 20B2 arranged on both sides of this light source fixing portion 20B1 while leaving a predetermined interval; a reflector support portion 20B3 arranged between the pair of boss portions 20B2; and a pin receiving portion 20B4 arranged in a lower portion of the light source fixing portion 20B1. The front end face 20a of the unit support member 20 is composed of a plane parallel with the perpendicular panel portion 20A which is perpendicular to the metallic die releasing direction of the unit support member 20.

The reflector support portion 20B3 of this unit attaching portion 20B is formed into a substantial C-shape when it is viewed from the front of the lighting device so that an upper face of the reflector support portion 20B3 can be on the same face as the upper face 38a of the rectilinear propagation blocking member 38:

The pin receiving portion 20B4 of this unit attaching portion 20B is formed at a position opposing to the positioning pin 38d of the rectilinear propagation blocking member 38. Between the pin receiving portion 20B4 and the light source fixing portion 29B1, the perpendicular rib 20c for connecting both of them is provided.

The rectilinear propagation blocking member 38 is screwed and fixed to the unit support member 20 in both the bracket portions 38c under the condition that each bracket 38c and the positioning pin 38d of the main body 38A are made to come into contact with the front end face 20a of the unit attaching portion 20B of the unit support member 20 at the positions of each boss portion 20B2 and the pin receiving portion 20B4.

The rectilinear propagation blocking member 38 is screwed and fixed to the unit support member 20 in such a manner that while the elastic bush 46 is interposed between each bracket 38c and each boss portion 20B2, and the rectilinear propagation blocking member 38 and the reflector 36 are fastened together. In order to realize this, in each bracket 36b of the reflector 36 and each bracket 38c of the rectilinear propagation blocking member 38, the screw insertion holes 36b1, 38c1, into which the screw 44 is inserted, are formed on the same straight line. On the front end face 20a of the unit attaching portion 20B of the unit support member 20, the screw hole 20b is formed at the position of each boss portion 20B2. The elastic bush 46 is composed of a ring-shaped member made of rubber, at the center of which the screw insertion hole 46a is formed.

As described above, the rectilinear propagation blocking member 38 is attached to the unit support member 20 while it is being stably supported by the three positions including a pair of boss portions 20B2 and the pin receiving portion 20B4. In this case, each boss portion 20B2 is screwed and fixed under the condition that the elastic bush 46 is interposed. Therefore, when the fastening force of the screw 46 is appropriately adjusted, the attaching posture of the rectilinear propagation blocking member 38 can be finely changed in the vertical and the horizontal direction. Due to the foregoing, the optical axis of the rectilinear propagation blocking member 38 can be adjusted.

As described before, in the present embodiment, the projection lens 32 and the rectilinear propagation blocking member 38 are formed integrally with each other so that the light control member 40 can be formed. Therefore, when the rectilinear propagation blocking member 38 is attached to the unit support member 20, the projection lens 32 can be simultaneously attached to the unit support member 20. When the fastening force of the screw 46 is adjusted, the optical axis of the projection lens 32 can be simultaneously adjusted.

On the other hand, the light emitting element 34 is fixed to the unit support member 20 when the support plate 42 for supporting the light emitting element 34 is press-fitted from the front side into the recess groove portion 20d formed in the light source fixing portion 20B1 of the unit attaching portion 20B.

Next, the specific structure of the lighting device unit 50 for condensing light will be explained below.

Figure 9:
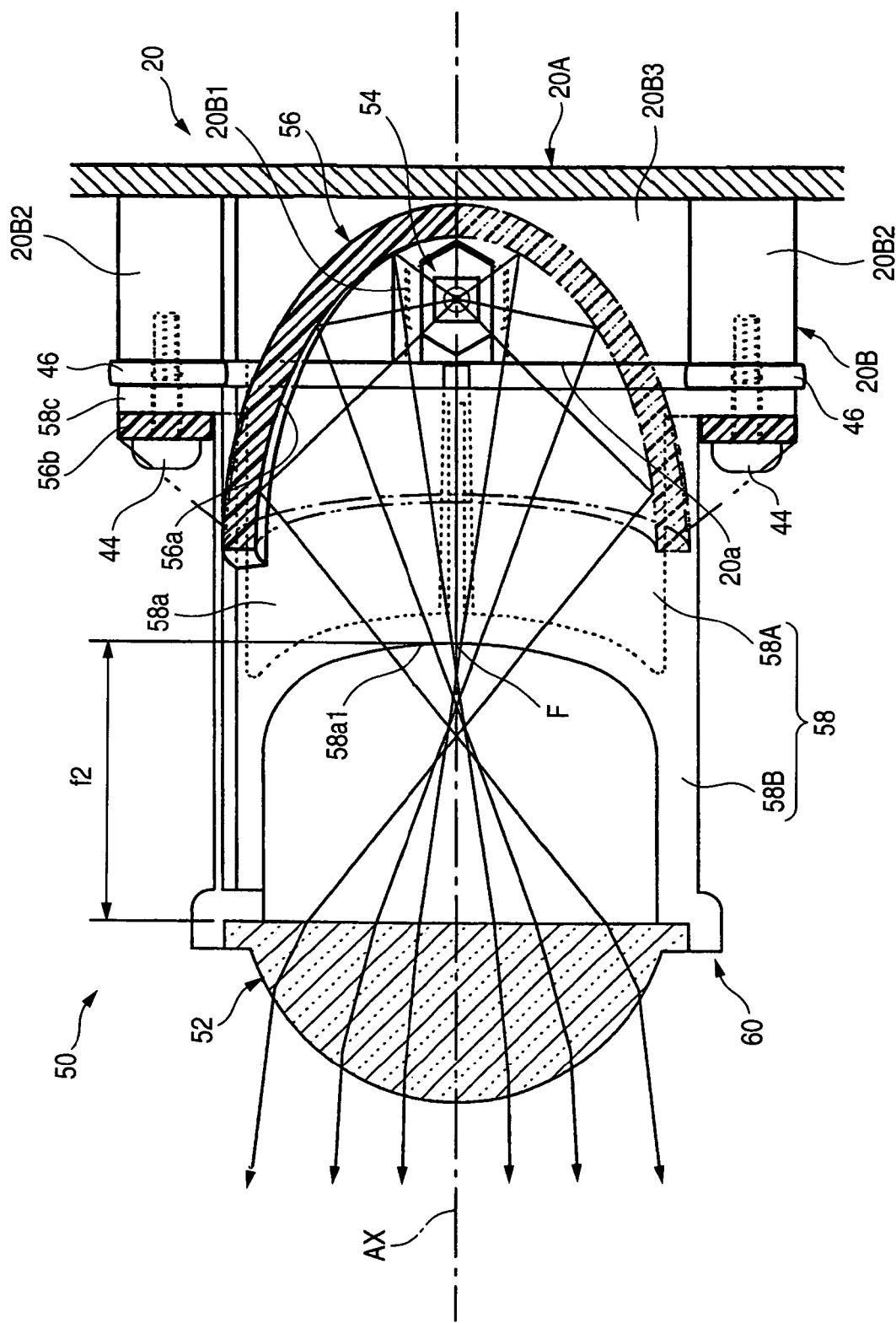

FIG. 9 is a sectional plan view showing the detail of the lighting device unit 50 for condensing light.

As shown in the drawing, the constitution of the light emitting element 54 and the reflector 56 of the lighting device unit 50 for condensing light is completely the same as the constitution of the light emitting element 34 and the reflector 36 of the lighting device unit 30 for medium diffusion. Further, the light control member 60 of the lighting device unit 50 for condensing light is completely same as the light control member 40 of the lighting device unit 30 for medium diffusion except for the following points.

The focal distance f2 of the projection lens 52 of the light control member 60 is longer than the focal distance f1 of the projection lens 32 of the lighting device unit 30. Corresponding to that, the longitudinal length of the lens holder 58B of the rectilinear propagation blocking member 58 of the light control member 60 is longer than the length of the lens holder portion 38B of the lighting device unit 30.

In the same manner as that of the lighting device unit 30 for medium diffusion, when the light emitting element 54, the reflector 56 and the light control member 60 of the lighting device unit 50 for condensing light are individually attached to the unit attaching portion 20B of the unit supporting member 20, the lighting device unit can be completed.

Under the condition that the elastic bush 46 is interposed between each bracket 58c and the boss portion 20B2 of the unit attaching portion 20B, the rectilinear propagation blocking member 58 is screwed and fixed to the unit attaching portion 20B together with each bracket 56b of the reflector 56. Due to the foregoing, the rectilinear propagation blocking member 58 is attached to the unit support member 20B in an embodiment in which the optical axis can be adjusted.

Next, the specific structure of the lighting device unit 70 for a wide diffusion will be explained below.

Figure 10:
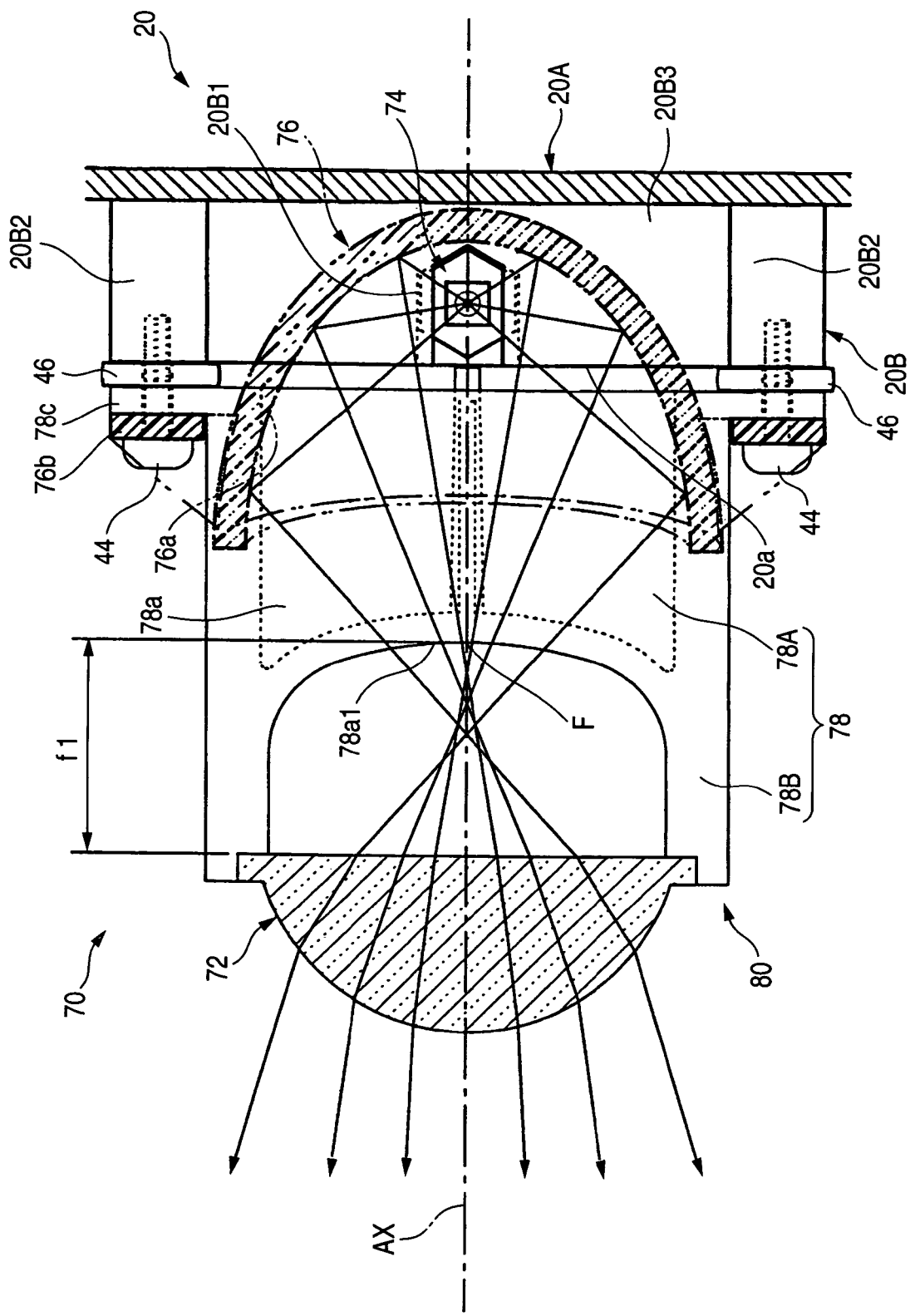

FIG. 10 is a sectional plan view showing the detail of the lighting device unit 70 for a wide diffusion.

As shown in the drawing, the structure of the light emitting element 74 and the projection lens 72 of the light control member 80 of this lighting device unit 70 for wide diffusion is completely the same as that of the light emitting element 34 and the projection lens 32 of the lighting device unit 30 for medium diffusion. The structure of the reflector 76 and the rectilinear propagation blocking member 78 of the light control member 80 is completely the same as that of the reflector 36 and the rectilinear propagation blocking member 38 of the lighting device unit 30 for medium diffusion except for the following points.

The essential structure of the reflector 76 is the same as that of the reflector 36. The reflecting face 76a of this reflector 76 is set in such a manner that the cross section of the reflector 76 including the optical axis $A_x$ is formed into a substantial elliptical shape and that the eccentricity is gradually increased from the perpendicular cross section to the horizontal cross section. In this case, a ratio of the increase in the eccentricity of the reflecting face 76a is high compared with the case of the reflector 36. Therefore, the lateral width of the reflector 76 is larger than the lateral width of the reflector 36.

The essential structure of the rectilinear propagation blocking member 78 is the same as that of the rectilinear propagation blocking member 38. The upper face 78a of the main body 78A of the rectilinear propagation blocking member 78 is extended to the rear from the rear side focus F of the projection lens 72. This upper face 78a is subjected to the reflecting face treatment. All region of this upper face 78a is composed of a horizontal face including the optical axis $A_x$. According to that, the peripheral lower end portion of the reflector 76 and the upper face of the reflector support portion 20B3 of the unit support member 20 are formed into a horizontal face.

In the same manner as that of the lighting device unit 30 for medium diffusion, when the light emitting element 74, the reflector 76 and the light control member 80 of the lighting device unit 70 for wide diffusion are individually attached to the unit attaching portion 20B of the unit supporting member 20, the lighting device unit can be completed.

Under the condition that the elastic bush 46 is interposed between each bracket 78c and the boss portion 20B2 of the unit attaching portion 20B, the rectilinear propagation blocking member 78 is screwed and fixed to the unit attaching portion 20B together with each bracket 76b of the reflector 76. Due to the foregoing, the rectilinear propagation blocking member 78 is attached to the unit support member 20B in an embodiment in which the optical axis can be adjusted.

Figure 11:
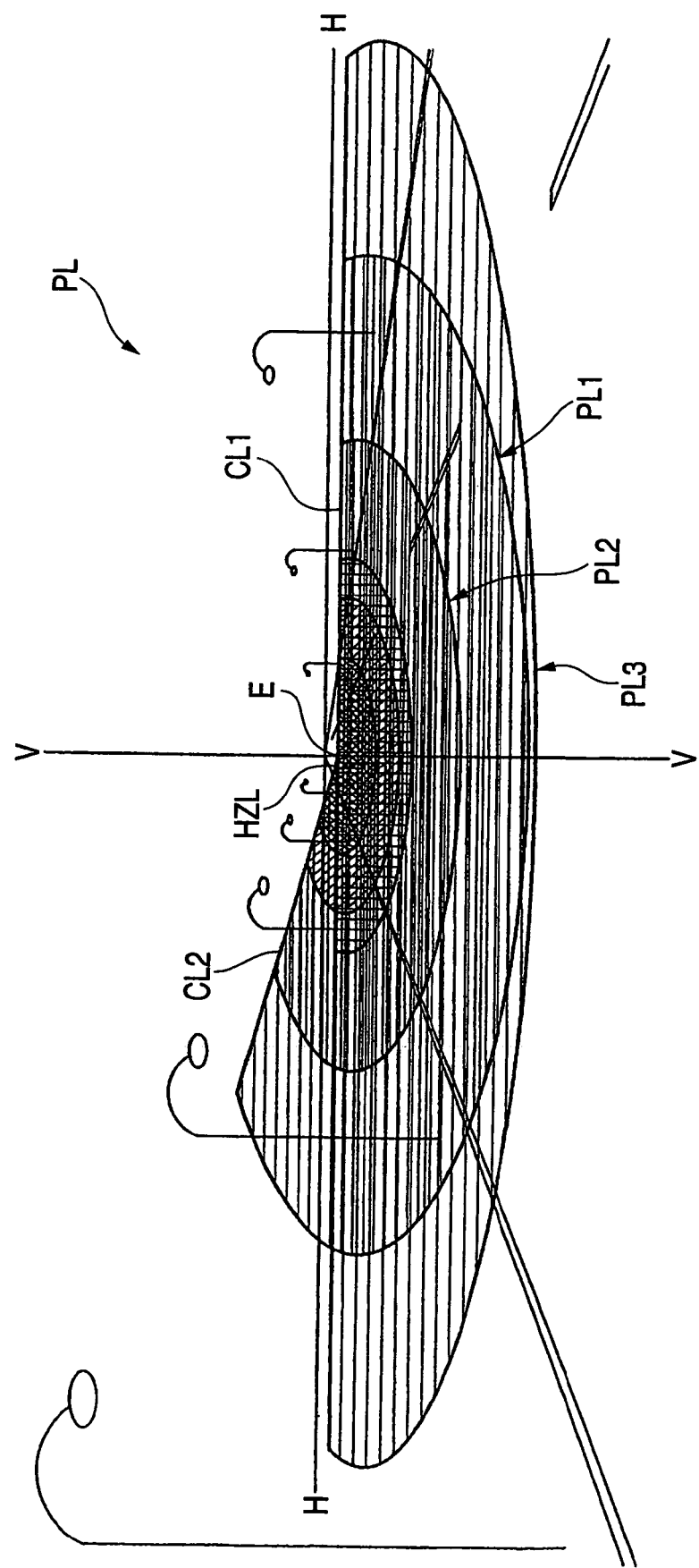
FIG. 11 is a perspective view showing a light distribution pattern for a low beam formed on a virtual perpendicular screen, which is arranged ahead at a position distant from a lighting device by 25 m, by a beam of light irradiated ahead by the above headlight.

FIG. 11 is a perspective view showing a light distribution pattern for a low beam formed on a virtual perpendicular screen, which is arranged ahead at a position distant from a lighting device by 25 m, by a beam of light irradiated ahead by the headlight 10 for vehicle use of the present embodiment.

As shown in the drawing, this light distribution pattern PL for a low beam is a light distribution pattern in which light is distributed to the left. This light distribution pattern PL for a low beam includes: the horizontal cutoff line CL1 at the upper end edge; and the oblique cutoff line CL2 which rises from this horizontal cutoff line CL1 by a predetermined angle (for example, 15°). A position of the elbow point E, which is an intersection of both the cutoff lines CL1 and CL2, is set at a position lower than H-V, which is a vanishing point in the front direction of the lighting device, by the angle of 0.5 to 0.6°. In this light distribution pattern PL for a low beam, the hot zone HZL, which is a region of high luminous intensity, is formed surrounding the elbow point E.

This light distribution pattern PL for a low beam is formed as a compound light distribution pattern including: three light distribution patterns PL1 for medium diffusion formed by the irradiation of light sent from three lighting device units 30 for medium diffusion; three light distribution patterns PL2 for condensing light formed by the irradiation of light sent from three lighting device units 50 for condensing light; and two light distribution patterns PL3 for wide diffusion formed by the irradiation of light sent from two lighting device units 70 for wide diffusion.

As shown in FIG. 12A, in the light distribution pattern PL1 for medium diffusion formed by the irradiation of light sent from the lighting device unit 30 for medium diffusion, as a reverse projected image of the front end edge 38a1 of the upper face 38a of the main body 38A of the rectilinear propagation blocking member 38, the horizontal cutoff line CL1 and the oblique cutoff line CL2 are formed. In this case, the upper face 38a of the main body 38A is composed as a reflecting face. Therefore, as shown by the two-dotted chain line in FIG. 5, a beam of light, which is to be emergent upward from the projection lens 32, in the reflected light reflected on the reflecting face 36a of the reflector 36 can be utilized as a beam of light, which is emergent downward from the projection lens 32 as shown by the solid line in the drawing, by the reflecting action of the upper face 38a. Due to the foregoing, a ratio of utilizing the luminous flux of the light emergent from the light emitting element 34 can be enhanced, and further the hot zone HZL1 can be formed.

As shown in FIG. 12B, in the light distribution pattern PL2 for condensing light formed by the irradiation of light sent from the lighting device unit 50 for condensing light, as a reverse projected image of the front end edge 58a1 of the upper face 58a of the main body 58A of the rectilinear propagation blocking member 58, the horizontal cutoff line CL1 and the oblique cutoff line CL2 are formed. In this case, the upper face 58a of the main body 38A is composed as a reflecting face. Therefore, a beam of light, which is to be emergent upward from the projection lens 52, in the reflected light reflected on the reflecting face 56a of the reflector 56 can be utilized as a beam of light which is emergent downward from the projection lens 52. Due to the foregoing, a ratio of utilizing the luminous flux of the light emergent from the light emitting element 54 can be enhanced, and further the hot zone HZL2 can be formed.

Since the focal distance f2 of the projection lens 52 is longer than the focal distance f1 of the projection lens 32, the light distribution pattern PL2 for condensing light is smaller and brighter than the light distribution pattern PL1 for medium diffusion. The hot zone HZL2 is smaller and brighter than the hot zone HZL1 of the light distribution pattern PL1 for medium diffusion.

On the other hand, in the light distribution pattern PL3 for wide diffusion formed by the irradiation of light sent from the lighting device unit 70 for wide diffusion, as a reverse projected image of the front end edge 78a1 of the upper face 78a of the main body 78A of the rectilinear propagation blocking member 78, the horizontal cutoff line CL1 is formed. In this case, the upper face 78a of the main body 78A is composed as a reflecting face. Therefore, a beam of light, which is to be emergent upward from the projection lens 72, in the reflected light reflected on the reflecting face 76a of the reflector 76 can be utilized as a beam of light, which is emergent downward from the projection lens 72, by the reflecting action of the upper space 78a. Due to the foregoing, a ratio of utilizing the luminous flux of the light emergent from the light emitting element 74 can be enhanced, and further the hot zone HZL3 can be formed.

In the light distribution pattern PL2 for wide diffusion, a ratio of the change of the eccentricity of the reflecting face 76a of the reflector 76 from the perpendicular cross section to the horizontal cross section is set to be higher than that of the reflector 36. Therefore, the diffusion angle in the traverse direction of the light distribution pattern PL2 is larger than that of the light distribution pattern PL1. In this connection, only the horizontal cutoff line CL1 is formed on the upper end edge of the light distribution pattern PL3 for wide diffusion, and the oblique cutoff line CL2 is not formed. The reason is that the upper face 78a of the main body 78A of the rectilinear propagation blocking member 78 is formed to be a horizontal face.

As the detail are described above, in the headlight 10 for vehicle use of the present embodiment, by the irradiation of light sent from the eight lighting device units 30, 50, 70, the light sources of which are the light emitting elements 34, 54, 74, the light distribution pattern PL for a low beam is formed which has the horizontal cutoff line CL1 and the oblique cutoff line CL2 at the upper end edge. Therefore, the thickness of the lighting device can be reduced.

Since these eight lighting device units 30, 50, 70 are supported by the common unit support member 20, when this unit support member 20 is tilted, the optical axes of these eight lighting device units 30, 50, 70 can be simultaneously adjusted.

Further, in the lighting device units 30, 50, 70, the light emitting elements 34, 54, 74 and the reflectors 36, 56, 76, which compose the optical members for controlling the light sent from these light emitting elements 34, 54, 74, and the light control members 40, 60, 80 are individually attached to the unit support member 20. Therefore, the structure of the lighting device can be made simple compared with a case in which these lighting device units, which have already been completed, are attached to the unit support member.

Further, according to the headlight 10 for vehicle use of the present embodiment, the rectilinear propagation blocking member 38, 58, 78 of the lighting device unit 30, 50, 70 is attached to the unit support member 20 so that the optical axis can be adjusted. Therefore, even in the case where the accuracy of shapes of the rectilinear propagation blocking member 38, 58, 78 and the unit support member 20 can not be sufficiently ensured, when the optical axis of the rectilinear propagation blocking member 38, 58, 78 is appropriately adjusted, the optical axis of the lighting device unit 30, 50, 70 can be easily arranged in order.

As described above, according to the present embodiment, while the thickness of the lighting device is being reduced, the optical axes of the plurality of lighting device units 30, 50, 70 can be simultaneously adjusted under the condition that the optical axes $A_x$ of the lighting device units 30, 50, 70 are put in order.

Especially, in the present embodiment, in the case where the lighting device unit 30, 50, 70 is composed of a projector type lighting device unit, it is important to ensure a positional relation accuracy between the projection lens 32, 52, 72 and the rectilinear propagation blocking member 38, 58, 78. However, according to this embodiment, since the projection lens 32, 52, 72 and the rectilinear propagation blocking member 38, 58, 78 are formed being integrated with each other into one body, the positional relation accuracy between both members can be sufficiently ensured. When the rectilinear propagation blocking member 38, 58, 78 is attached to the unit support member 20 in a predetermined posture, the projection lens 32, 52, 72, which is formed being integrated with the rectilinear propagation blocking member 38, 58, 78, can be attached to the unit support member 20 in a predetermined posture. In this case, when an optical axis adjustment is conducted on the rectilinear propagation blocking member 38, 58, 78, an optical axis adjustment can be simultaneously conducted on the projection lens 32, 52, 72.

In this embodiment, the rectilinear propagation blocking member 38, 58, 78 of each lighting device unit 30, 50, 70 is fixed by means of screwing to each unit attaching section 20B of the unit support member 20 via the elastic bush 46 at a pair of the right and left boss portions 20B. Therefore, by a very simple structure, the rectilinear propagation blocking member 38, 58, 78 can be tilted and the optical axis can be adjusted. In this connection, in the explanations made in this embodiment, the elastic bush 46 is made of rubber, however, of course, it is possible to employ an elastic bush made of materials except for rubber. (For example, it is possible to employ an elastic bush made of thermo-elastomer.)

In the present embodiment, eight lighting device units 30, 50, 70 are composed of three types of units. They are the lighting device units 30 for medium diffusion, the lighting device units 50 for condensing light and the lighting device units 70 for wide diffusion. Therefore, the light distribution pattern PL for a low beam formed by these lighting device units can be formed as a compound light distribution pattern including the light distribution pattern PL1 for medium diffusion, the light distribution pattern PL2 for condensing light and the light distribution pattern PL3 for wide diffusion. Due to the foregoing, the luminous intensity of the light distribution pattern PL for a low beam can be made uniform.

In the present embodiment, each of the eight lighting device units 30, 50, 70 has a reflector 36, 56, 76 which reflects a beam of light emitted by the light emitting element 34, 54, 74 to the front so that the beam of light can be converged upon the neighborhood of the rear side focus F of the projection lens 32, 52, 72. Due to the foregoing, a ratio of utilizing the luminous flux of the light emergent from the light emitting element 34, 54, 74 can be enhanced. In this case, the reflector 36, 56, 76 is attached to the unit attaching portion 20B being fastened together with the rectilinear propagation blocking member 38, 58, 78, each component of the lighting device unit 30, 50, 70 can be highly efficiently assembled. Further, the reflector 36, 56, 76 can be highly accurately attached to the unit support member 20.

Especially in the present embodiment, since the unit support member 20 is composed of a die-cast product, the following operational effects can be provided.

When the light emitting element 34, 54, 74 of each lighting device unit 30, 50, 70 emits light, heat is generated from the light emitting element. However, since each light emitting element 34, 54, 74 is attached to the unit support member 20 composed of a die-cast product, heat generated by each light emitting element 34, 54, 74 can be quickly transmitted to the unit support member 20, the heat capacity of which is large, by the action of heat conduction. Due to the foregoing, a temperature rise of the light emitting element 34, 54, 74 can be suppressed. Therefore, it is possible to effectively prevent the luminous flux of the light emitting element 34, 54, 74 from being decreased. It is also possible to prevent the color of emitted light from becoming discolored.

In this connection, in the above embodiment, explanations are made into the constitution in which eight lighting device units 30, 50, 70 are supported by the common unit support member 20. However, instead of the above constitution, it is possible to adopt such a constitution that a plurality of unit support members are provided and a plurality of lighting device units are classified into a plurality of groups and that each of the groups is supported by each unit support member.

Figure 13:
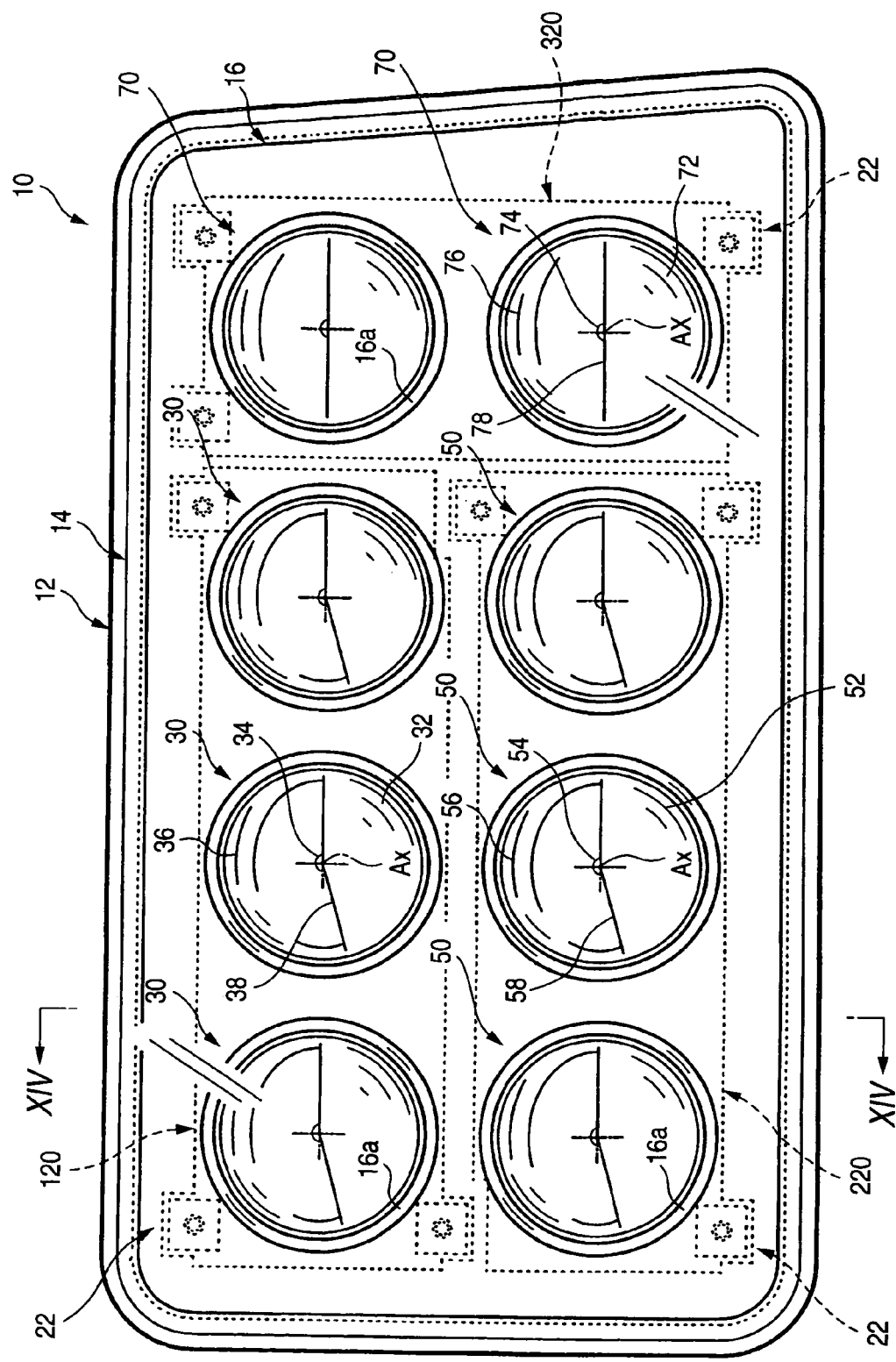

For example, as shown in FIGS. 13 and 14, it is possible to adopt the following constitution. Eight lighting device units 30, 50, 70 are classified into three groups including three lighting device units 30 for intermediate diffusion, three lighting units 50 for condensing light and two lighting device units 70 for wide diffusion, and each group is supported by an each common unit support member 120, 220, 320 provided for each group.

When the above constitution is adopted, by tilting each unit support member 120, 220, 320, the optical axes of eight lighting device units 30, 50, 70 can be simultaneously adjusted for each group. Due to the foregoing, although the operation of the optical axis adjustment becomes somewhat complicated, the optical axis can be precisely adjusted. Especially when eight lighting device units 30, 50, 70 are classified-into three types of lighting device units by the light distribution function and the optical axis is adjusted, it becomes easy to form a desired combined light distribution pattern.

In this connection, in the above embodiment, the rectilinear propagation blocking member 38 is attached to the unit attaching portion 20B in such a manner that the rectilinear propagation blocking member 38 is fixed by screwing at a pair of right and left brackets 38c formed at the rear end portion of the main body 38A, and the other rectilinear propagation blocking members 58, 78 are composed in the same manner. However, of course, the other attaching structure can be adopted.

In the above embodiment, the size of the light emitting chip 34a of the light emitting element 34 is approximately 0.3 to 1 mm square. However, it is possible to form the light emitting chip 34a of the light emitting element 34 into the other size and profile. Examples of the size and profile of the light emitting chip 34a of the light emitting element 34 are: a rectangle, the short side of which is 1 mm and the long side of which is 2 mm; and a rectangle, the short side of which is 1 mm and the long side of which is 4 mm. The circumstances are the same with respect to the light emitting chips of the other light emitting elements 54, 74.

In the above embodiment, the headlight for vehicle use includes: three lighting device units 30 for medium diffusion; three lighting device units 50 for condensing light; and two lighting device units 70 for wide diffusion. However, the numbers of these lighting device units are not limited to the above. Of course, any number of the lighting device units except for the aforementioned numbers can be adopted.

In the above embodiment, explanations are made into the projector type lighting device unit in which each lighting device unit 30, 50, 70 includes a reflector 36, 56, 76. However, it is possible to adopt a composition in which a light-shielding member having a predetermined upper end edge shape corresponding to a cutoff line is arranged as a rectilinear propagation blocking member in the neighborhood of the rear side focus F of the projection lens 32, 52, 72 and a light emitting element is arranged in the neighborhood at the rear of this light-shielding member. Further, it is possible to adopt a lighting device unit except for the projector type, for example, a parabola type lighting device unit or a direct light type lighting device unit can be adopted.

In the headlight 10 for vehicle use of the above embodiment, only the lighting device unit 30, 50, 70 for forming a light distribution pattern for a low beam is accommodated in the lighting chamber. However, of course, the lighting device unit for forming a light distribution pattern for a high beam can accommodated in the lighting chamber.

In the above embodiment, explanations are made into the headlight 10 for vehicle use arranged on the right of the front end portion of a vehicle. However, concerning the headlight for vehicle use arranged on the left of the front end portion of the vehicle, when the same constitution as that of the above embodiment is adopted, the same operational effects as those of the above embodiment can be provided.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A headlight comprising:
    a plurality of lighting device units, wherein each lighting device unit includes a light emitting element and at least one optical member for controlling the light emitted by the light emitting element; and
    a unit support member that supports the plurality of lighting device units,
    wherein the optical member and the light emitting element of each lighting device unit are individually attached to the unit support member,
    wherein an optical axis of a predetermined optical member in each lighting device unit is adjustable relative to the unit support member, and
    wherein a predetermined light distribution pattern is formed when light is irradiated by the plurality of lighting device units.

2. The headlight according to claim 1, wherein the unit support member is comprised of a die-cast product.

3. The headlight according to claim 1, wherein the predetermined optical member is fixed to the unit support member with screws through elastic bushes at a plurality of positions.

4. The headlight according to claim 1, further comprising a plurality of unit support members, wherein the plurality of lighting device units are classified into a plurality of groups and, each group is supported by the unit support members for each group.

5. The headlight according to claim 1, wherein the optical axis of the predetermined optical member in each lighting device unit is adjustable relative to the light emitting element in each light device unit.

* * * * *